(12) United States Patent
Eder

(10) Patent No.: US 10,930,430 B2
(45) Date of Patent: Feb. 23, 2021

(54) COIL ASSEMBLY

(71) Applicant: etaEM GmbH, Munich (DE)

(72) Inventor: Stephan Eder, Munich (DE)

(73) Assignee: etaEM GmbH, Munich (DE)

( * ) Notice: Subject to any disclaimer, the term of this patent is extended or adjusted under 35 U.S.C. 154(b) by 132 days.

(21) Appl. No.: 16/320,735

(22) PCT Filed: Jul. 26, 2017

(86) PCT No.: PCT/EP2017/068860
§ 371 (c)(1),
(2) Date: Jan. 25, 2019

(87) PCT Pub. No.: WO2018/019876
PCT Pub. Date: Feb. 1, 2018

(65) Prior Publication Data
US 2019/0189343 A1    Jun. 20, 2019

(30) Foreign Application Priority Data

Jul. 27, 2016  (DE) ...................... 10 2016 113 839.8

(51) Int. Cl.
*H01F 38/14* (2006.01)
*H02J 50/12* (2016.01)
(Continued)

(52) U.S. Cl.
CPC ........... *H01F 38/14* (2013.01); *H01F 27/288* (2013.01); *H01F 27/2823* (2013.01);
(Continued)

(58) Field of Classification Search
CPC .. H02J 50/12; H02J 7/025; H02J 50/10; H02J 5/005; H02J 50/005; H01F 38/14;
(Continued)

(56) References Cited

U.S. PATENT DOCUMENTS 3,550,137 A   12/1970  Kuecken
4,477,766 A   10/1984  Akita et al.
(Continued)

FOREIGN PATENT DOCUMENTS

EP    2701284 A1   2/2014
JP    2002075753 A  3/2002
(Continued)

OTHER PUBLICATIONS

"Top band (160m ? 1.8 MHz) DX operation" (orig.published in The Low Band Monitor in Nov. 1994).
(Continued)

*Primary Examiner* — Ryan Johnson

(57) ABSTRACT

A coil assembly for generating or for receiving alternating magnetic fields comprises at least one primary coil having at least one winding and comprises at least one secondary coil provided for a selective influencing of the resonance behavior of the coil assembly and having at least one winding, wherein the primary coil has a main conductor and a shielding conductor at least sectionally surrounding the main conductor. The shielding conductor is electrically conductively connected to the main conductor and has at least one section that is electrically interrupted.

17 Claims, 9 Drawing Sheets

(51) Int. Cl.
  *H01F 27/28* (2006.01)
  *H04B 5/00* (2006.01)
  *H02J 7/02* (2016.01)

(52) U.S. Cl.
  CPC ............ *H02J 50/12* (2016.02); *H04B 5/0037* (2013.01); *H01F 2027/2833* (2013.01); *H02J 7/025* (2013.01)

(58) Field of Classification Search
  CPC ............ H01F 27/28; H01F 2027/2833; H01F 27/288; H04B 5/0037; H04B 5/0093
  See application file for complete search history.

(56) References Cited

U.S. PATENT DOCUMENTS

| | | |
|---|---|---|
| 4,816,766 A | 3/1989 | Zabel et al. |
| 7,573,432 B1 | 8/2009 | Eydelman et al. |
| 9,962,085 B2 * | 5/2018 | Griffith .................. H02J 50/12 |
| 2012/0062214 A1 | 3/2012 | Bares |
| 2012/0235502 A1 * | 9/2012 | Kesler ..................... H03H 7/40 307/104 |
| 2014/0197832 A1 | 7/2014 | Driesel et al. |
| 2015/0028687 A1 | 1/2015 | Hattori et al. |
| 2015/0323620 A1 | 11/2015 | Yang et al. |
| 2015/0341085 A1 | 11/2015 | Ettes et al. |
| 2016/0036244 A1 | 2/2016 | Griffith |
| 2017/0236638 A1 | 8/2017 | Mayo |

FOREIGN PATENT DOCUMENTS

| | | |
|---|---|---|
| JP | 2011234496 A | 11/2011 |
| JP | 2013162644 A | 8/2013 |

OTHER PUBLICATIONS

Andr Kurs, et al. "Wireless Power Transfer via Strongly Coupled Magnetic Resonances", Science 317, 83 (2007); DOI: 10.1126/science.1143254.

* cited by examiner

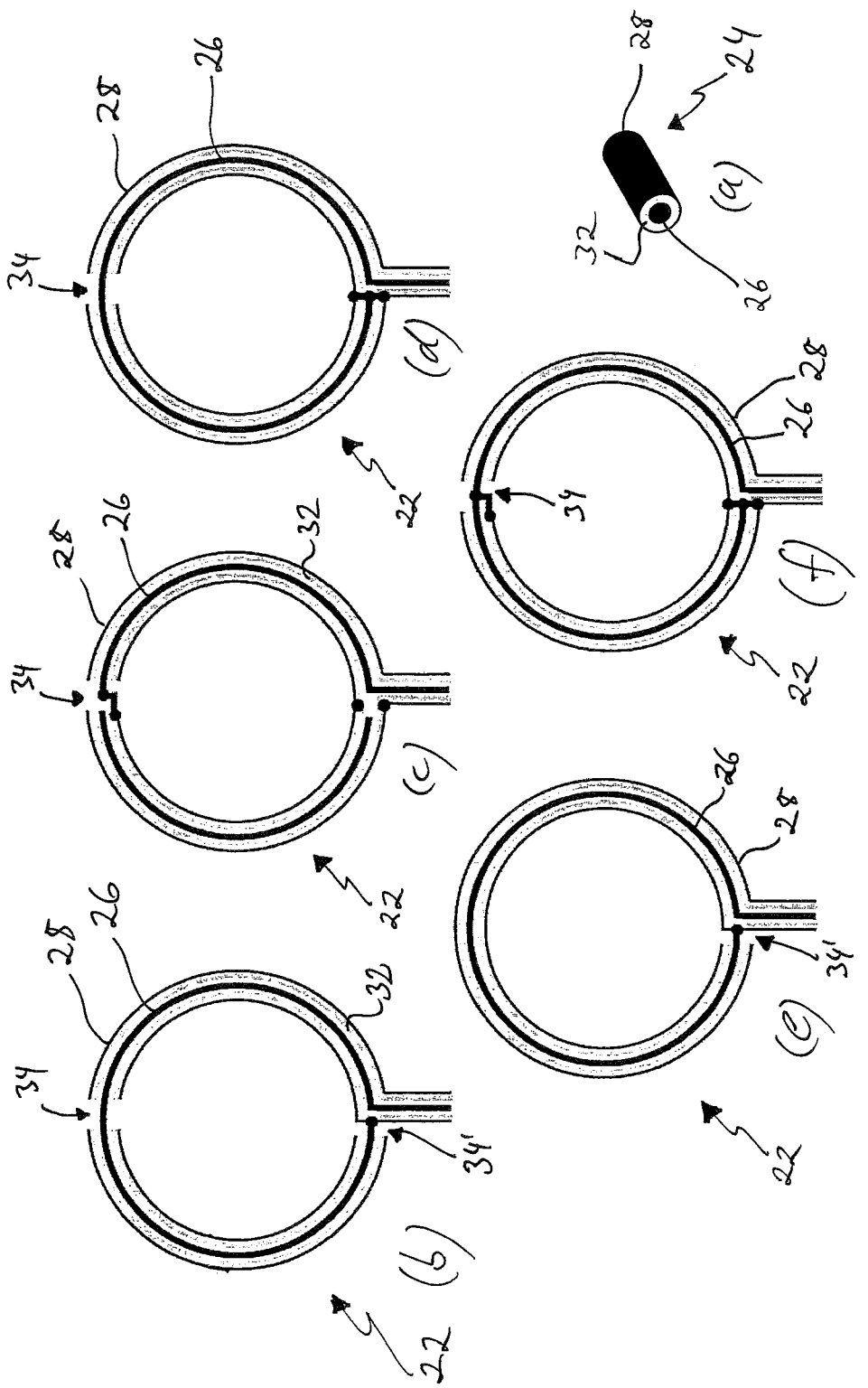

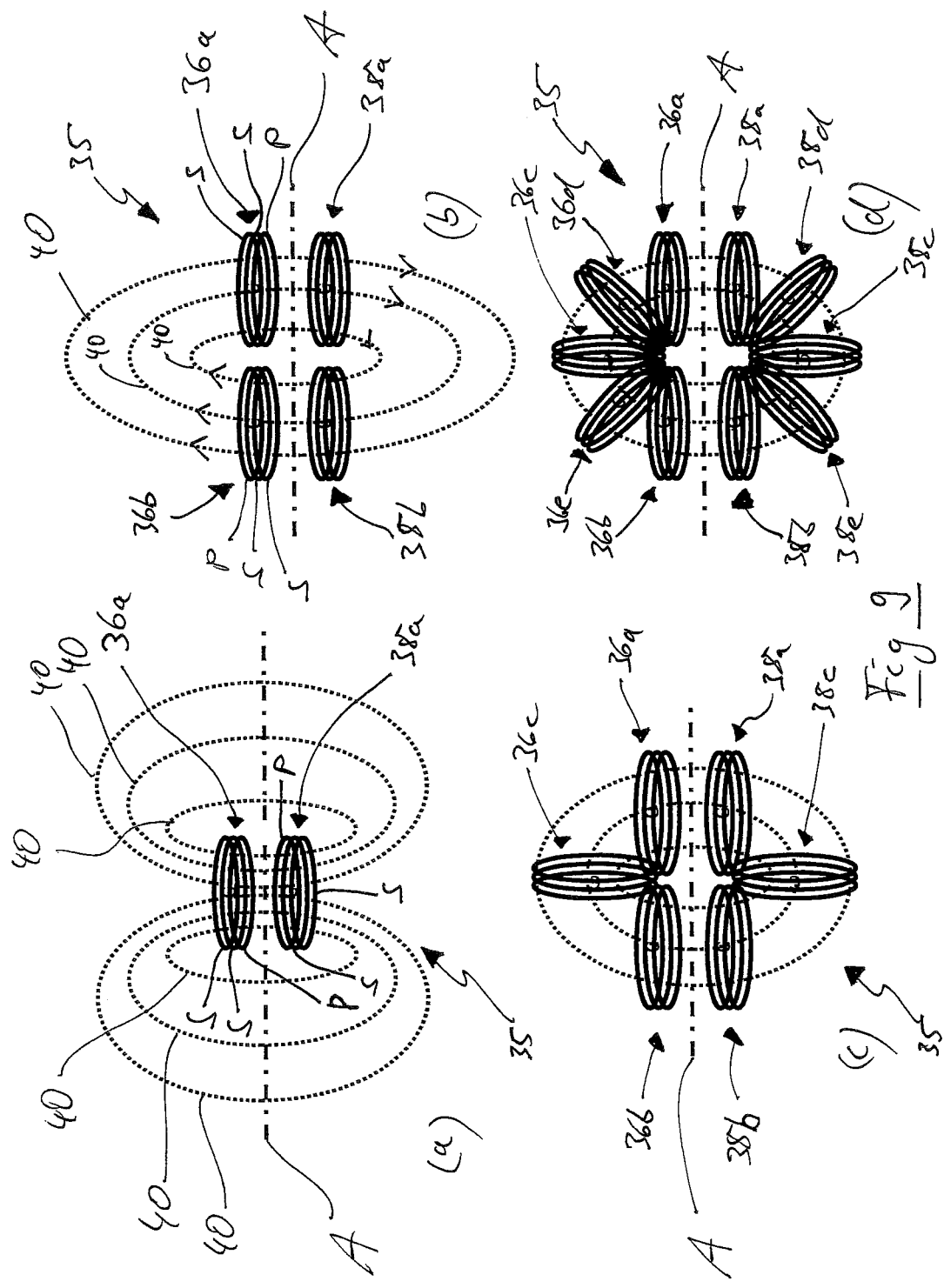

COIL ASSEMBLY

INTRODUCTION

The present invention relates to an apparatus for generating or for receiving alternating magnetic fields.

BACKGROUND

Such apparatus are generally known and respectively comprise an electric coil that has current applied by means of an alternating voltage to generate an alternating magnetic field. The coil can, however, also serve the reception of an alternating magnetic field in that the voltage that is induced in the coil due to the alternating magnetic field flowing through the coil is tapped at the terminals of the coil.

Apparatus of the above-named kind that can also be called magnetic antennas, are used e.g. for an electrical power transmission, in particular for a wireless electrical supply of electric consumers driven by batteries respectively rechargeable batteries. Further applications can be found in communication technology (transmission of communication signals) and in metrology (e.g. magnetic field probes).

A problem of said apparatus is the electromagnetic losses that occur in operation and that can e.g. negatively influence the efficiency of an electrical power transmission. In other words, the respective efficiency of the apparatus is not satisfactory. For this reason, attempts are being made by means of suitable circuits to influence the resonance behavior of a respective apparatus such that the efficiency of the apparatus is increased at least at the bias point (e.g. at a specific alternating voltage frequency). In the ideal case, the frequency at which a so-called resonance rise of the apparatus adopts its maximum value coincides with the alternating voltage frequency at which the apparatus should be operated.

An electronic circuit for generating a desired resonance rise, for example, comprises a rotary capacitor that is coupled to a coil provided for generating or for receiving alternating magnetic fields. Additional capacitors and inductances can furthermore be used to enforce a specific resonance rise. The costs for such an electronic "resonance optimization circuit" and the effort for calibrating this circuit, however, represent a substantial disadvantage so that there is a need for a simpler and less expensive solution for resonance optimization.

SUMMARY

In accordance with the invention, a coil assembly is proposed that comprises at least one primary coil having at least one winding and at least one secondary coil provided for a selective influencing of the resonance behavior of the coil assembly and having at least one winding. The primary coil has a main conductor and a shielding conductor at least sectionally surrounding the main conductor, wherein the shielding conductor is electrically conductively connected to the main conductor and has at least one section that is electrically interrupted.

The primary coil can also be called a useful coil, with the secondary coil acting as an auxiliary coil to selectively influence the resonance behavior of the total coil assembly, in particular of the primary coil. In this connection, "selective influence" is understood as a direct change toward a desired state. This also includes an optimization with reference to predefined criteria, e.g. a resonance rise in a specific frequency range or a maximum impedance to be observed.

In other words, the selective influencing can be adapted to an improvement of the quality of the primary coil or of the so-called Q-factor or quality factor. It is e.g. possible with the coil assembly in accordance with the invention to improve the quality factor from a typical value of Q=0.5 to values in the range of Q=5.

Both the primary coil and the secondary coil can each be configured as simple—single winding or multiple winding conductor loops ("ring antennas"), with the conductor e.g. being circularly bent back on itself. The primary coil is preferably at least sectionally electrically insulated, whereby unwanted electrical contacts of the primary coil are inhibited.

The coil assembly in accordance with the invention combines a plurality of advantages. On the one hand, the coil assembly manages without any complex resonance optimization circuit. One or more secondary coils are used, in particular exclusively, to influence the resonance behavior. This solution has provided surprising effectively and has the advantage of low costs and of simple implementability. The in particular inductive impedance of the primary coil can furthermore be lower than with a conventional influencing of the resonance behavior by means of a separate electronic circuit. In the latter case, the vibration in the coil has so-to-say be enforced against the small efficiency of the coil (high damping). With the coil assembly in accordance with the invention, in contrast, the efficiency is directly increased in that the damping of the vibration itself is reduced. The power losses can thus be considerably reduced. Losses converted into waste heat are in particular lowered so that the coil assembly in accordance with the invention heats up less in operation than conventionally resonance-optimized coils.

On the other hand, the inventive solution is characterized by a skillful configuration of a main conductor and of a shielding conductor. The shielding conductor in particular has the task of liberating the electromagnetic field emanating from the main conductor from the electrical field component so that an alternating magnetic field that is as pure as possible and that represents the useful field remains remote from the shielding conductor. At the same time, the shielding conductor can act as an electric terminal of the primary coil from that point onward at which the main conductor is connected to the shielding conductor. An electric alternating voltage can, for example, be applied between the main conductor and the shielding conductor to generate an alternating magnetic field. The electrically interrupted section of the shielding conductor is preferably positioned such that the shielding conductor does not form an electrically short circuited ring in the coil to avoid unwanted short circuit currents. The secondary coil is also preferably configured such that short circuit currents in the secondary coil are avoided. The terminals of the secondary coil can be open for this purpose. This has proven to be a particularly efficient measure to achieve the desired resonance behavior. The coil assembly is preferably operated at correspondingly high alternating voltage frequencies or at alternating magnetic field frequencies so that the so-called skin effect in the shielding conductor comes into force to suppress the electric field, e.g. at frequencies of 1 MHz and more. The advantages in accordance with the invention can also already be achieved at lower frequencies in suitable configurations.

As mentioned above, the secondary coil is provided to selectively influence the resonance behavior of the coil assembly. The kind and the degree of the influence can be dependent on at least one of the following parameters: number of windings of the primary coil and/or of the at least one secondary coil; diameter of the primary coil and/or of the at least one secondary coil; position of the at least one secondary coil relative to the primary coil (e.g. spacing between the secondary coil and the primary coil); alignment of the at least one secondary coil relative to the primary coil (e.g. coaxial (parallel), slanted); number of secondary coils. It is understood that these parameters can be selectively varied independently of one another to form the resonance behavior in a desired manner. The only requirement is that the secondary coil is configured and is arranged in spatial proximity to the primary coil such that it can cooperate with the primary coil—at least at a desired bias point, e.g. at a specific alternating voltage frequency.

The quality and the configuration of the main conductor and of the shielding conductor can be named as further parameters that have an effect on the resonance behavior. On the one hand, the respective diameter of the main conductor and of the shielding conductor plays a great role. On the other hand, the spacing between the main conductor and the shielding conductor as well as the surface of the shielding conductor are of significance. It is understood that existing insulation material, in particular its relative permittivity, is also relevant. In particular that insulation material has been found to be particularly relevant that extends between the main conductor and the shielding conductor since the capacitance between the two conductors and thus the resonance behavior of the total coil assembly can hereby be substantially influenced.

The primary coil can be selectively configured in different manner for a selective influencing of the resonance behavior. Detailed examples for this—in particular with respect to the connection between the main conductor and the shielding conductor and to the electrically interrupted section of the shielding conductor—will be provided further below.

As already mentioned, the coil assembly can comprise both a plurality of primary coils and a plurality of secondary coils, with these being able to be designed and arranged differently independently of one another. All the coils of the coil assembly in particular do not necessarily have to be arranged symmetrically. If a plurality of primary coils are provided, they can be connected, i.e. electrically connected to one another, in parallel or in series. A common voltage tapping can thus e.g. be provided for all the primary coils or an alternating voltage can be applied to all the primary coils via a common electric terminal.

Advantageous embodiments of the invention are described in the description, in the dependent claims, and in the drawings.

In accordance with an embodiment, the at least one secondary coil has a main conductor and a shielding conductor at least sectionally surrounding the main conductor. Differing from the primary coil, the shielding conductor of the secondary coil can be electrically insulated from the main conductor and/or can be configured as free of interruption. However, this does not absolutely have to be the case.

In general, the primary coil and the secondary coil can have a similar or even identical design. It must, however, be noted that the secondary coil is preferably operated as a purely passive element, i.e. without any feed voltage or voltage tapping. The secondary coil can accordingly e.g. be configured without any electric terminals. It is understood that the primary coil and the secondary coil should not be electrically connected to one another. In accordance with the invention, only a substantially magnetic field-based inductive cooperation is aimed for between the two coils or coil groups.

In accordance with a preferred embodiment, the primary coil and/or the secondary coil is/are configured at least sectionally as a coaxial cable or as coaxial cables, i.e. the main conductor (core) is arranged coaxially in the shielding conductor that is configured as hollow cylindrical. Electrical insulation material can be provided between the main conductor and the shielding conductor. The shielding conductor can additionally be surrounded by insulation material. In general, the coaxial cable provided for the primary coil and/or the secondary coil can be configured as commercial coaxial cable that is available practically without restriction and inexpensively on the market. Commercial coaxial cables are as a rule flexible so that a coil can be produced particularly simply from them and can be easily adapted to the dimensions of a housing as part of a later installation. In general, however, less flexible or even rigid coaxial cables or coaxial conductors can also be considered. It in any case does not necessarily have to be a commercial coaxial cable of a known design. Coaxial cable-like conductors are also conceivable that e.g. comprise an insulated conductor with a subsequently wound shield.

In accordance with a further embodiment, the at least one secondary coil is arranged coaxially to the primary coil. The construction of the coil assembly can hereby be configured as comparatively compact. The at least one secondary coil can in particular be—directly or indirectly—fastened to the primary coil. The secondary coil can, for example, be directly fastened to the primary coil using known cable ties, with an electrical contact between the primary coil and the secondary coil being able to be precluded due to an insulation at least surrounding the shielding conductor of the primary coil. An indirect fastening can e.g. be implemented by a common frame to which both the primary coil and the secondary coil are fastened—in particular at a well-defined spacing from one another. The arrangement of the coils with respect to one another can thus be implemented simply and inexpensively.

A particularly compact construction can be achieved if the diameter of the secondary coil is at least substantially the same as the diameter of the primary coil. The degree of influencing of the resonance behavior by the secondary coil can hereby likewise be improved.

The invention furthermore relates to a system having at least one first coil assembly for generating alternating magnetic fields and at least one second coil assembly for receiving alternating magnetic fields, wherein the first and/or second coil assemblies are configured in accordance with at least one of the above-described embodiments. In accordance with an advantageous embodiment of the system, the resonance behavior of the first coil assembly and the resonance behavior of the second coil assembly are matched to one another, with a mutual influencing of the two coil assemblies also being able to be taken into account. The respective resonance behaviors are preferably substantially the same so that the two coil assemblies can be resonantly inductively coupled and so that a particularly high overall efficiency results.

To improve the magnetic flux between the first and second coil assemblies, a plurality of first and/or second coil assemblies can be provided that can each be configured differently and do not necessarily have to be arranged symmetrically. The total efficiency can be increased again by the use of a plurality of first and/or second coil assemblies, with the individual alternating magnetic fields being able to be superposed to form a useful field predominantly flowing through the coil assemblies. The first and second coil assemblies are preferably arranged relative to one another such that the "magnetic field lines" extend at least predominantly in the same sense through all the coil assemblies, i.e. are not oriented against one another. It is understood that the coil assemblies are preferably operated synchronously, i.e. that the primary coils in particular have a current applied simultaneously or that an induced voltage is tapped at all the primary coils at the same time.

A further subject matter of the invention is the use of a coil assembly in accordance with at least one of the above-described embodiments for a wireless supply of an electrical energy store, in particular of a mobile electrical or electronic apparatus, with electrical energy. In other words, the coil assembly can be used for the inductive charging of mobile electrical or electronic consumers, in particular of purely electric or hybrid motor vehicles or mobile communication devices, e.g. smartphones or tablets.

The invention further comprises the use of a system of the above-described kind, wherein the primary coil of the first coil assembly is coupled with an electrical supply network and the primary coil of the secondary coil assembly is coupled with an electrical energy store, in particular with a mobile electrical or electronic apparatus. In other words, said use for inductive charging can also take place with the system in accordance with the invention. It is understood that the coupling of the first coil assembly to the electrical supply network does not have to be configured such that an electrically conductive connection is present between the first coil assembly and the supply network. An inductive coupling can also be provided instead of such a connection. The same applies to the coupling between the second coil assembly and the electrical energy store (e.g. battery respectively rechargeable battery).

Advantageous applications for a coil assembly in accordance with the invention or for a system in accordance with the invention can also be found in an electrical connection of closed systems that can or should not be supplied in a wired manner, e.g. by means of an electric plug. This generally relates to "sealing systems" that have a specifically adapted pressure in a housing or should include or keep away a medium, e.g. a liquid medium, (e.g. waterproof cellular phones or cameras). The energy supply of electrical implants that are implanted in the body of a person or of an animal can also be effected wirelessly with the aid of the invention.

In addition, a coil assembly in accordance with the invention or a system in accordance with the invention can also be used to transmit data. In a corresponding embodiment of the coil assembly, the secondary coil can be acted on by a data signal and/or can be configured for the reception of a data signal. A corresponding system comprises at least two such coil assemblies. The secondary coil of the first coil assembly is, for example, coupled to a data source and the secondary coil of the secondary assembly is coupled to a data receiver, and vice versa. Such a system also enables, in addition to the energy transmission, the transmission of information that can, for example, be used to control the energy transmission. In general, however, other kinds of data can also be transmitted.

BRIEF DESCRIPTION OF THE DRAWINGS

The invention will be explained only by way of example in the following with reference to the drawings in which FIGS. 1 to 7 each show a coordinate system in which at least one experimentally determined curve of the magnetic inductance is shown over the frequency, also called a resonance spectrum in the following—with respect to the determination of the resonance behavior. Different embodiments of the primary coil are shown in FIG. 8.

FIG. 8a illustrates a perspective view of a coaxial cable;

FIG. 8b illustrates a cross-sectional view of a first variant of a RF-coax-B field coil;

FIG. 8c illustrates a cross-sectional view of a second variant of a RF-coax-B field coil;

FIG. 8d illustrates a cross-sectional view of a third variant of a RF-coax-B field coil;

FIG. 8e illustrates a cross-sectional view of a fourth variant of a RF-coax-B field coil;

FIG. 8f illustrates a cross-sectional view of a fifth variant of a RF-coax-B field coil;

FIG. 9a illustrates a first system in a schematic representation having at least one first and at least one second coil assembly;

FIG. 9b illustrates a second system in a schematic representation having at least one first and at least one second coil assembly;

FIG. 9c illustrates a third system in a schematic representation having at least one first and at least one second coil assembly; and FIG. 9d illustrates a fourth system in a schematic representation having at least one first and at least one second coil assembly.

DETAILED DESCRIPTION

Figure 1:
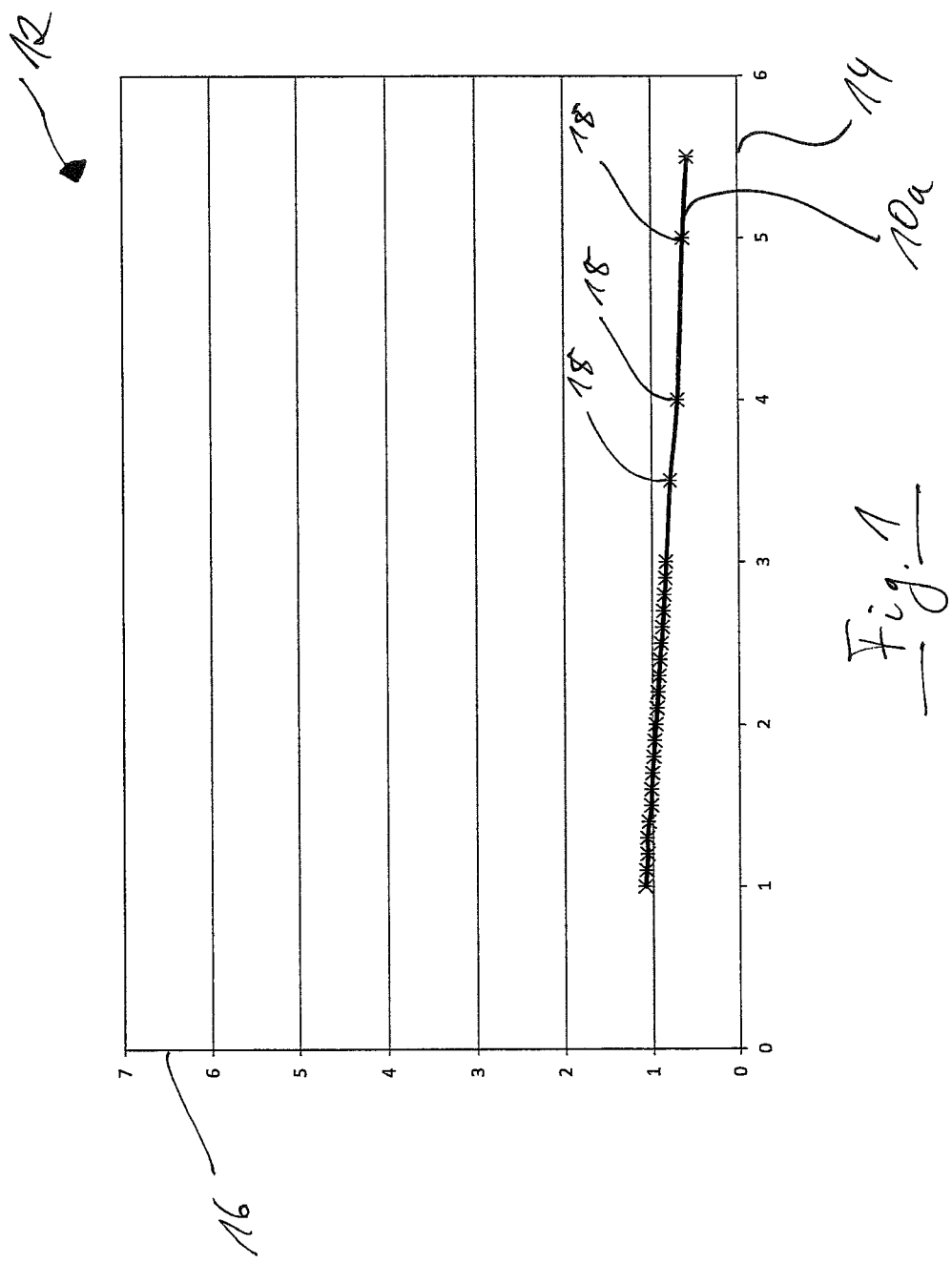
FIG. 1 illustrates a resonance spectrum of a single-winding primary coil without a secondary coil.

Parts that are the same or similar can be marked by the same reference numerals in the following.

FIG. 1 shows a resonance spectrum 10a of a primary coil having a winding (n=1, coil not shown). The resonance spectrum 10a is entered in a coordinate system 12 that provides the dimension "alternating voltage frequency" on the x axis 14 and the dimension "magnetic induction factor" on the y axis 16. The x axis 14 comprises a range from 0 to 6 MHz. The magnetic induction factor indicated with respect to the y axis 16 is the ratio of the induced voltage to the voltage fed in. The fed in voltage is that alternating voltage that is applied to the primary coil to generate the alternating magnetic field. The induced voltage is that voltage that is e.g. caused by the generated alternating magnetic field in a magnetic field probe (at a defined spacing from the primary coil). The magnetic induction factor therefore ultimately indicates how efficiently the feed voltage is converted into an inductively measured magnetic field (B field). The magnetic induction factor will also be called the efficiency in the following.

Figure 2:
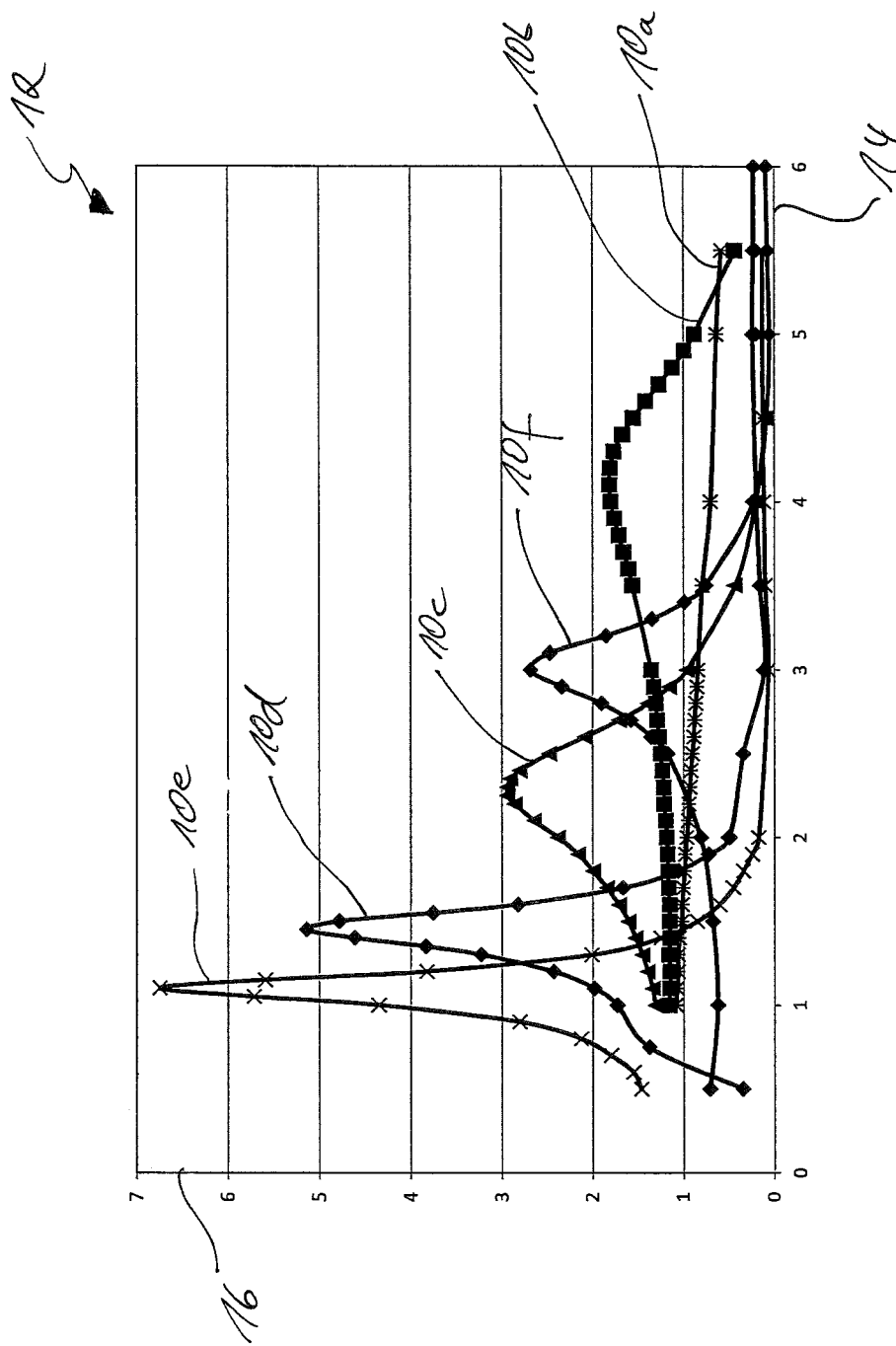
FIG. 2 illustrates the resonance spectrum of FIG. 1 and resonance spectra of different coil assemblies in accordance with the invention each having a primary coil having one winding and having different secondary coils.

The resonance spectrum 10a comprises a plurality of discrete measurement points 18, with the resonance spectrum 10a between the individual measurement points 18 being interpolated. As can easily be recognized in FIG. 1, the resonance spectrum 10a does not have any resonance rise, i.e. the resonance spectrum 10a is substantially flat in the measurement range so that the efficiency is equally low substantially independently of the frequency. To influence the resonance behavior of the primary coil, i.e. to change the resonance spectrum 10a, at least one secondary coil (not shown) can now be brought into the near field of the primary coil so that a coil assembly (not shown) in accordance with the invention results. Correspondingly resulting resonance spectra 10b to 10f are shown in FIG. 2, with the resonance spectrum 10a of FIG. 1 likewise being entered in FIG. 2 to facilitate a comparison of the spectra 10a to 10f.

The resonance spectrum 10b results for the case of a secondary coil having two windings (m=2), with a slight resonance rise being achieved in the range about 4.2 MHz. The resonance spectra 10c to 10e result for the cases of a secondary coil having 3 (m=3; 10c), four (m=4; 10d), and five (m=5; 10e) windings. As can be recognized, resonance rises having higher maxima can be reached with an increasing number of windings m of the secondary coil, with the range of the resonance rise being displaced toward lower frequencies as the bandwidth reduces.

The resonance spectrum 10f results for the case of two secondary coils each having two windings (2×m=2). As can be recognized, the resonance spectrum 10f differs from the resonance spectrum 10d (a secondary coil having four windings (m=4). The range of the resonance rise in the specifically used coil assembly is thus at approximately twice the frequency in the resonance spectrum 10f in comparison with the resonance spectrum 10d, with the maximum being approximately halved. The bandwidth is furthermore approximately doubled. Different rises or displacements can result with other coil assemblies.

Figure 3:
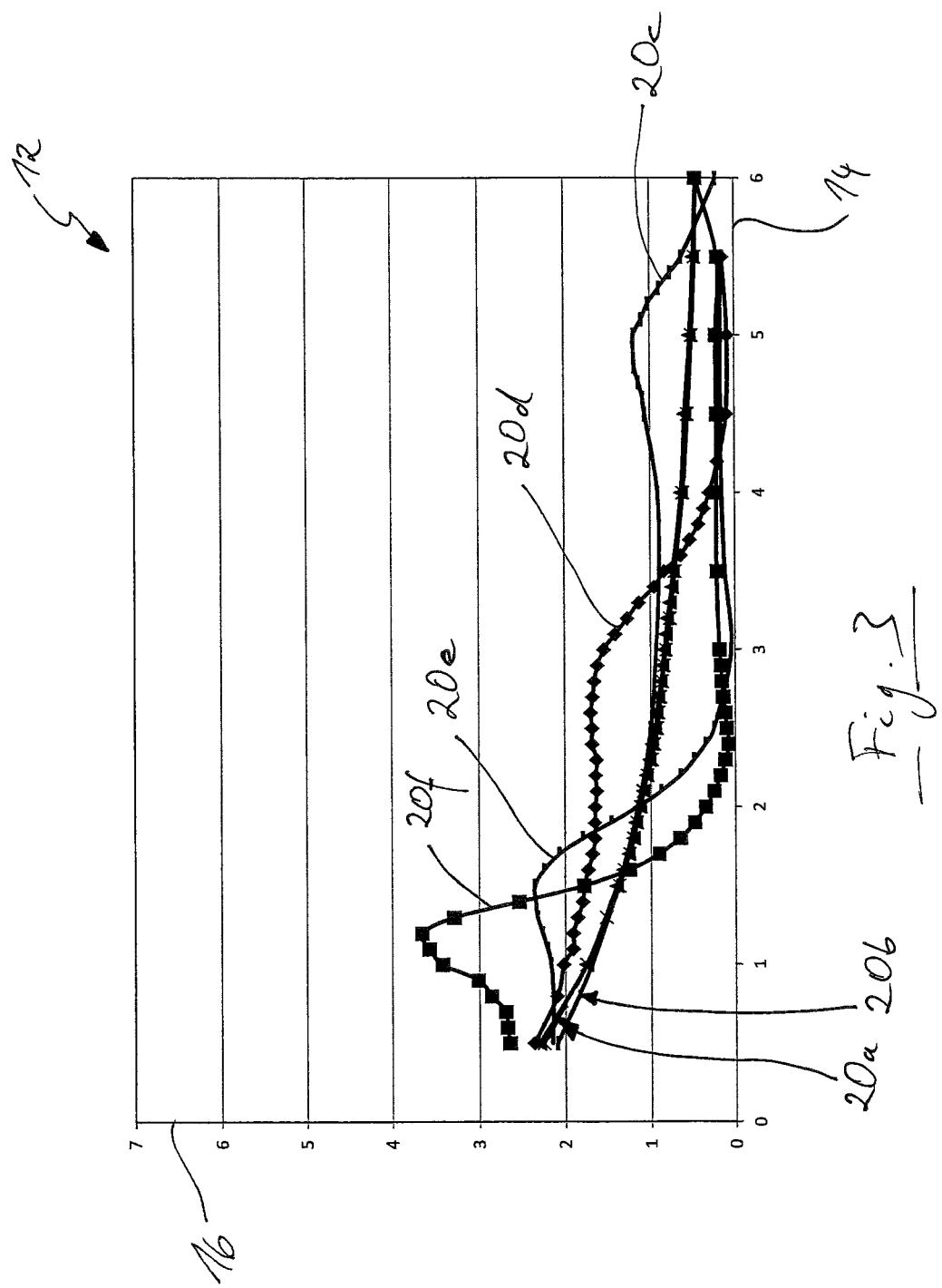
FIG. 3 illustrates resonance spectra of different coil assemblies in accordance with the invention each having a primary coil having two windings and having different secondary coils.

Resonance spectra 20a to 20f for the case of a primary coil having two windings (n=2) are shown in FIG. 3. The resonance spectrum 20a differs from the resonance spectra 20b to 20f in that no secondary coil was located in the near field of the primary coil in the determination of the resonance spectrum 20a. The resonance spectra 20b to 20f were in contrast determined with an assembly of a secondary coil having one (m=1; 20b), two (m=2; 20c), three (m=3; 20d), four (m=4; 20e), and five (m=5; 20f) windings in the near field of the primary coil (n=2). It is striking that the resonance spectrum 20a is almost unchanged for the case of an m=1 secondary coil (cf. 20b). A slight resonance rise at approximately 5 MHz only appears on a use of an m=2 secondary coil (20c). As the number of windings m of the secondary coil increases, the range of the resonance rise is displaced toward lower frequencies, with the respective maximum increasing and the bandwidth decreasing.

Figure 4:
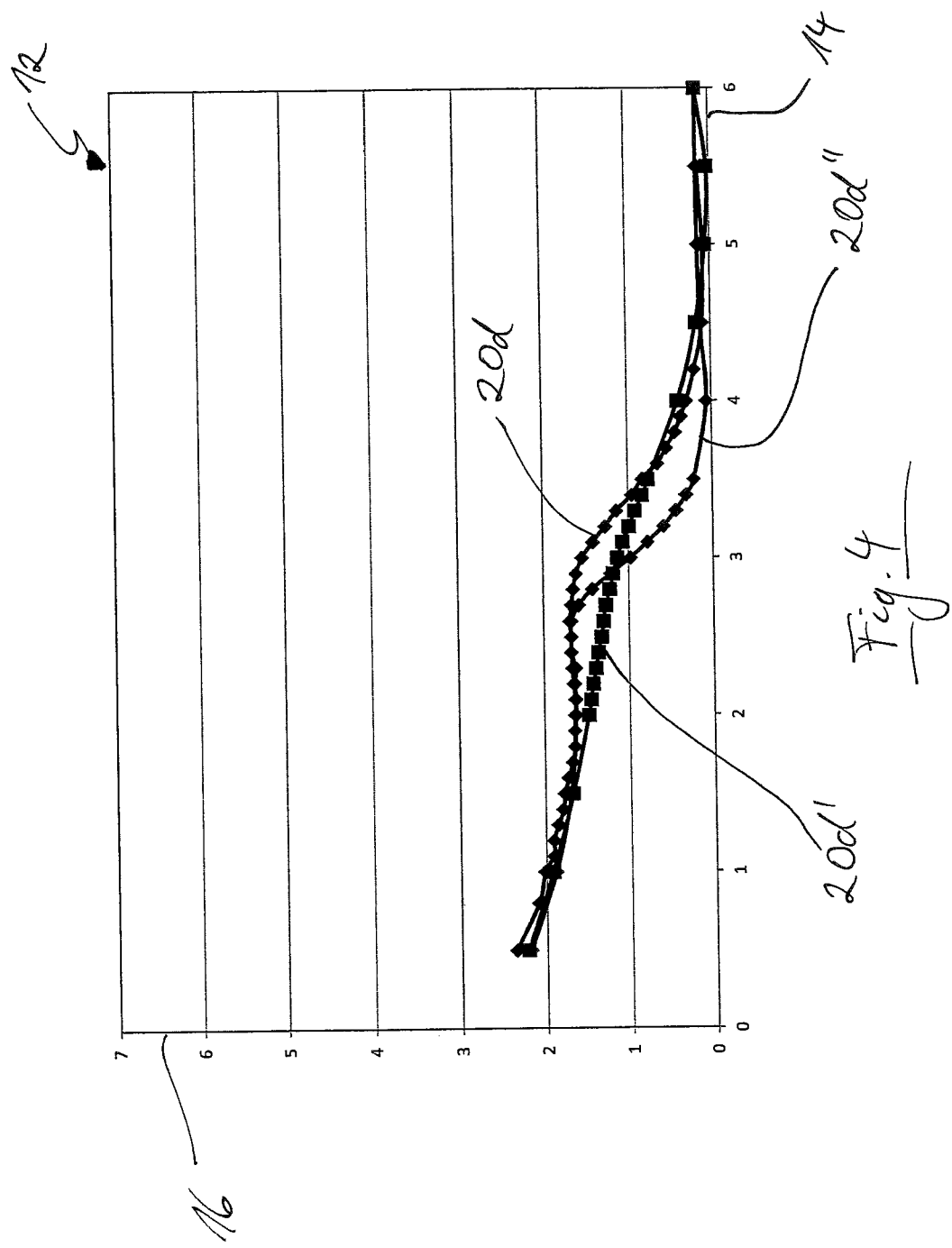
FIG. 4 illustrates further resonance spectra of different coil assemblies in accordance with the invention each having a primary coil having two windings and having different secondary coils.

The resonance spectrum 20d of FIG. 3 (n=2 primary coil and m=3 secondary coil) is shown again in FIG. 4. In comparison to this, resonance spectra 20d' and 20d'' are shown that have likewise been found for the case of an n=2 primary coil and an m=3 secondary coil, but with differently dense packing. To determine the resonance spectrum 20d, the primary coil and the secondary coil are only loosely placed next to one another (as also in the other resonance spectra 10a-f, 20a-c, and 20e-f). To determine the resonance spectrum 20d', the primary coil and the secondary coil were packed into a common tube having a tube diameter of approximately 5 cm. The resonance spectrum 20d'' was determined for an assembly in which the primary coil and the secondary coil are firmly tied together by means of cable binders. As can be recognized, the amount of the resonance rise decreases in the resonance spectra 20d' and 20d'' in comparison with the resonance spectrum 20d.

Figure 5:
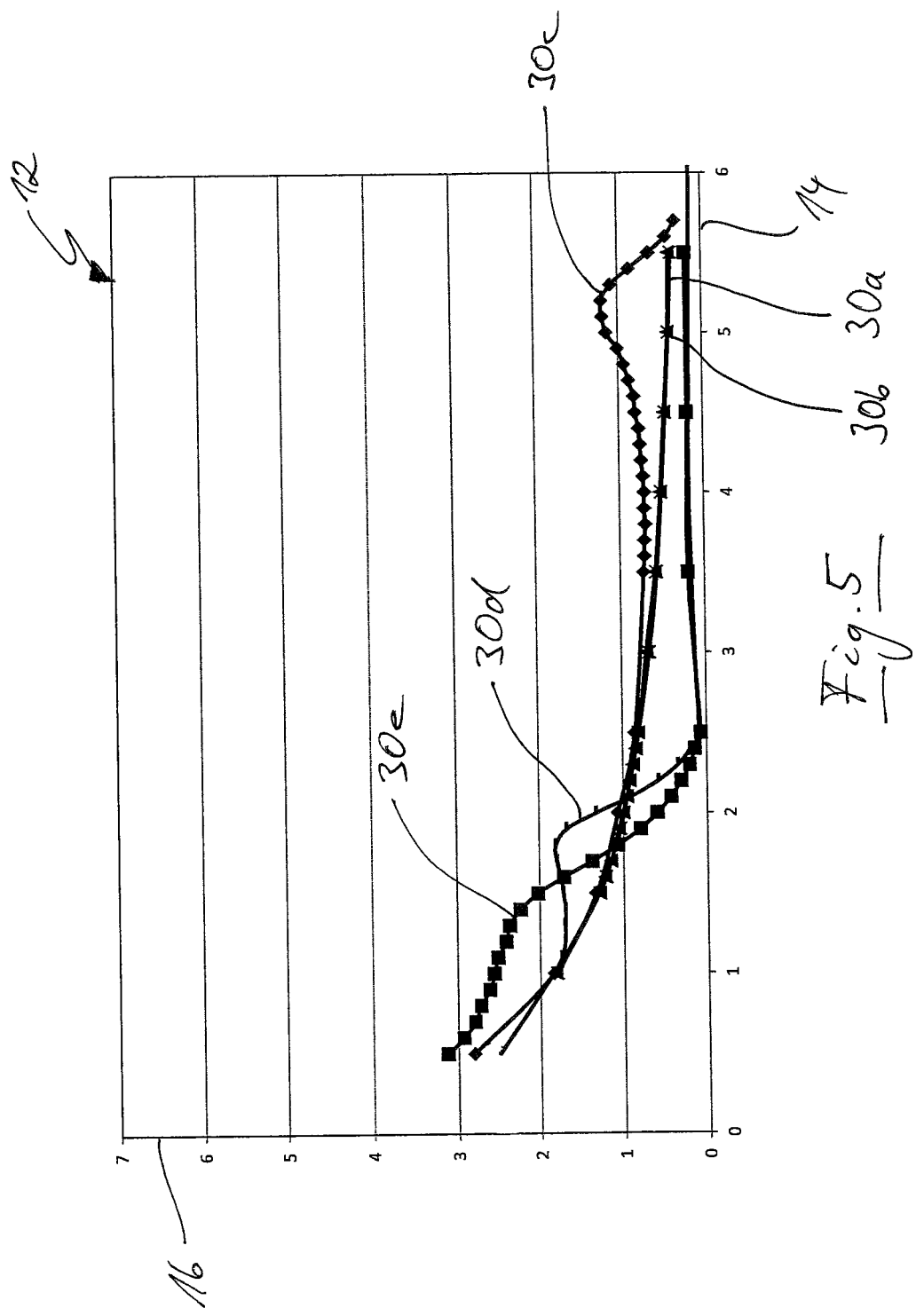
FIG. 5 illustrates resonance spectra of different coil assemblies in accordance with the invention each having a primary coil having three windings and having different secondary coils.

Resonance spectra 30a to 30e are shown in FIG. 5 for assemblies having an n=3 primary coil. The resonance spectrum 30a differs from the resonance spectra 30b to 30e in that no secondary coil was located in the near field of the primary coil in the determination of the resonance spectrum 30a. The resonance spectra 30b to 30e were in contrast determined with a secondary coil having one (m=1; 30b), two (m=2; 30c), four (m=4; 30d), and five (m) 5; 30e) windings in the near field of the primary coil having three windings. In a similar manner as with the resonance spectra 20a to 20f of FIG. 3, the resonance spectrum 30a is only noticeably changed from a secondary coil onward having m>1 (cf. resonance spectra 30a, 30b with 30c).

Figure 6:
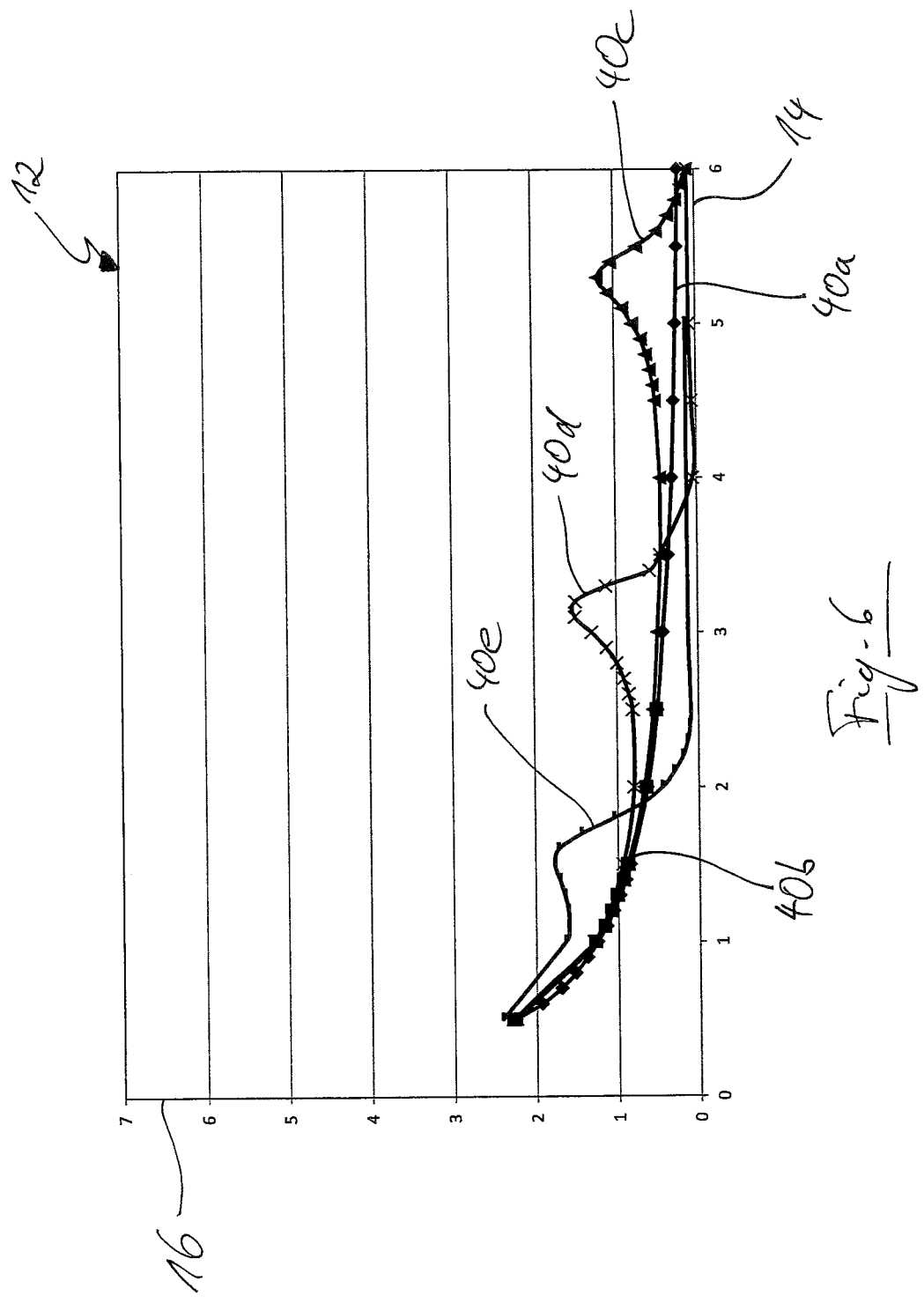
FIG. 6 illustrates resonance spectra of different coil assemblies in accordance with the invention each having a primary coil having four windings and having different secondary coils.

Resonance spectra 40a to 40e for assemblies having an n=4 primary coil are shown in FIG. 6, with the resonance spectrum 40a having been determined without a secondary coil. On the measurement of the resonance spectra 40b to 40e, there was a secondary coil having one (m=1; 40b), two (m=2; 40c), three (m=3; 40d), and five (m=5; 40e) windings in the near field of the primary coil having n=4.

Figure 7:
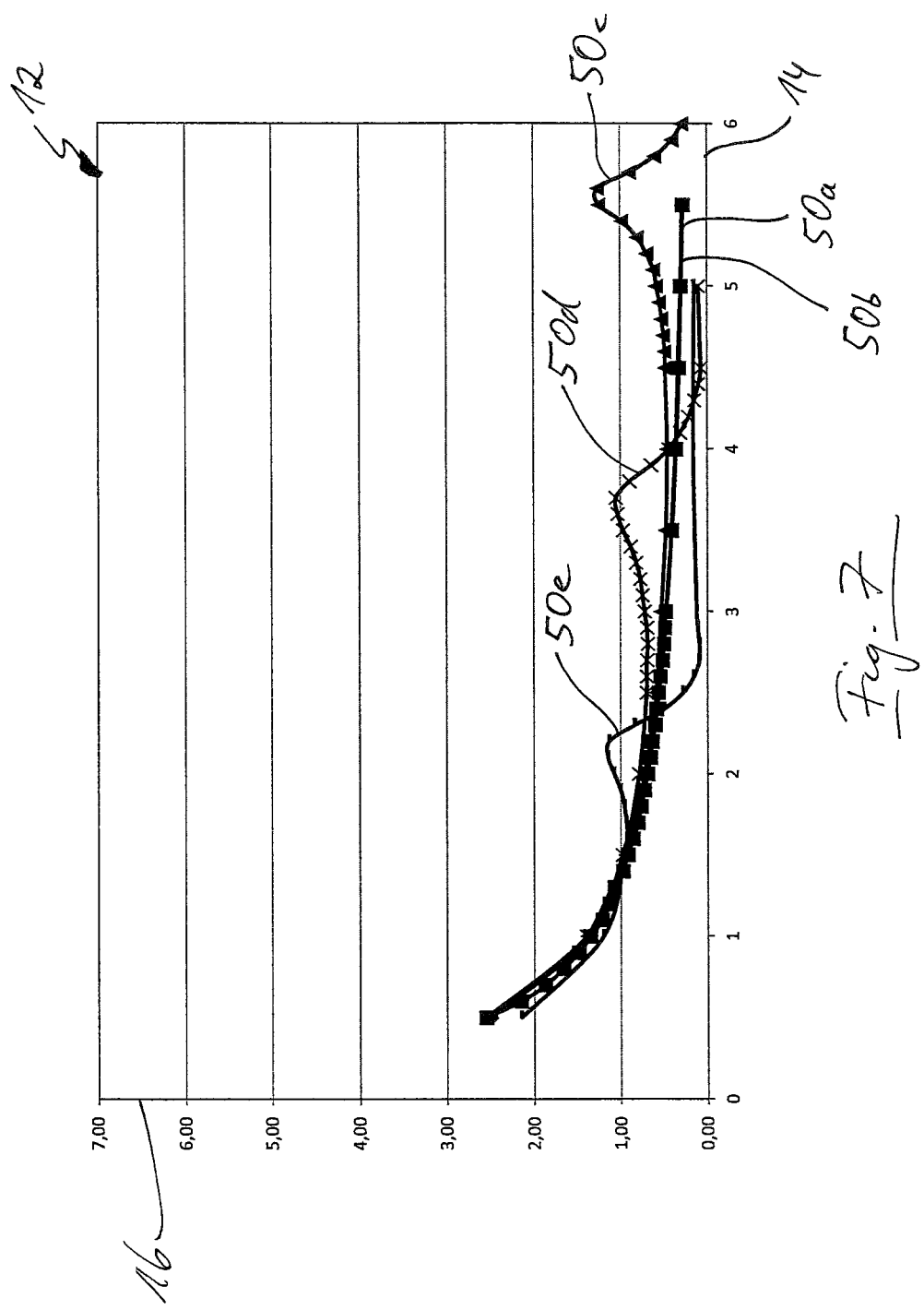
FIG. 7 illustrates resonance spectra of different coil assemblies in accordance with the invention each having a primary coil having five windings and having different secondary coils.

FIG. 7 shows resonance spectra 50a to 50e for the case of a primary coil having five windings (n=5), with the resonance spectrum 50a having been determined without a secondary coil. On the determination of the resonance spectra 50b to 50e, there was a secondary coil having one (m=1; 50b), two (m=2; 50c), three (m=3; 50d), and four (m=4; 50e) windings in the near field of the primary coil having n=5.

Different variants of "RF-coax-B field coils" 22 are shown in respective longitudinal sectional views in FIGS. 8b to 8f. Each of the shown RF-coax-B field coils 22 can act as a primary coil of a coil assembly (not shown) in accordance with the invention. A respective RF-coax-B field coil 22 is produced from a coaxial cable 24 of which a section is shown perspectively in FIG. 8a. The coaxial cable 24 comprises a main conductor 26 and a hollow cylindrical shielding conductor 28, wherein electrical insulation material 32 extends between the main conductor 26 and the shielding conductor 28. The shielding conductor 28 can furthermore be surrounded by an electrically insulating jacket (not shown), e.g. plastic. It is understood that the shielding conductor 28 is preferably closed peripherally, i.e. around the main conductor 26.

In the RF-coax-B field coil 22 of FIG. 8b, the main conductor 26 is electrically connected to the shielding conductor 28 after one winding. The shielding conductor 28 has two sections 34 and 34' that are electrically interrupted. In the RF-coax-B field coil 22 of FIG. 8c, the main conductor 26 is electrically connected to the shielding conductor 28 after half a winding. The shielding conductor 28 in turn has a section 34 that is electrically interrupted. In contrast to the case of FIG. 8b, the limb of the shielding conductor 28 at the left side (half winding) is electrically connected to the right limb of the shielding conductor 28. In contrast, the main conductor 26 in the left limb is not connected either to the shielding conductor 28 or to the main connector 26 in the right limb.

In the RF-coax-B field coil 22 of FIG. 8d, the main conductor 26 is again electrically connected to the shielding conductor 28 after one winding (as in FIG. 8b). The shielding conductor 28 has a section 34 that is electrically interrupted after half a winding. Furthermore, the limb of the shielding conductor 28 (half winding) at the left side is electrically connected to the right limb of the shielding conductor 28 (as in FIG. 8c).

In the RF-coax-B field coil 22 of FIG. 8e, the main conductor 26 is electrically connected to the shielding conductor 28 after one winding (as in FIG. 8b). The shielding conductor 28 has an electrically interrupted section 34' after one winding. The section 34 is therefore missing here in comparison with the embodiment shown in FIG. 8b.

The RF-coax-B field coil 22 of FIG. 8f corresponds to the RF-coax-B field coil 22 of FIG. 8d, with the main conductor 26 additionally being connected to the shielding conductor 28 after half a winding.

The respective electrically interrupted section 34, 34' does not necessarily have to be arranged at the position shown in the respective embodiment. The section 34 of e.g. FIG. 8b in particular does not have to be positioned after half a winding.

It is understood that the explained RF-coax-B field coils 22 are shown only by way of example with respect to their basic design. The number of windings can naturally be increased with an otherwise unchanging design. All the resonance spectra 10, 20, 30, 40, 40 shown in the Figures were determined using a respective primary coil of the type of the RF-coax-B field coil 22 of FIG. 8d (having different numbers of windings and a coil diameter of 60 cm; the secondary coil being placed, with the exception of the spectra 20d', 20d'', loosely at the primary coil).

The determination of a respective resonance spectrum 10, 20, 30, 40, 50 can comprise an averaging of individual measurement instances (individual measurement of a resonance spectrum). The resonance spectra shown in the Figures thus have an experimental character, i.e. the specific configuration of the resonance spectrum can in individual cases differ from the shown curves, depending on the measurement conditions. As, however, familiar to the skilled person, the shown resonance spectra documents the effect in accordance with the invention, namely selectively influencing the resonance behavior of a coil assembly by at least one secondary coil.

Different systems 35 are respectively shown in FIGS. 9a to 9d with at least one first coil assembly 36a for generating alternating magnetic fields and with at least one second coil assembly 38a for receiving alternating magnetic fields. Purely by way of example, the coil assemblies 36a, 38a each comprise a primary coil P and two secondary coils S. The assembly "SSP" (seen from above) shown in FIG. 9a can be different, that is "SPS" or "PSS" both in the first and in the second coil assembly 36a, 38a. The applies in an analog manner also to the embodiments of FIGS. 9b to 9d.

It generally applies that each coil assembly 36a-36e, 38a-38d can be individually adapted (e.g. with respect to the number and design of the coils P, S and their relative arrangement) to optimize the properties of the respective system 35.

The coil assemblies 36a, 38a are arranged coaxially with respect to one another in FIG. 9a, with a large portion of the alternating magnetic field extending through the coil assemblies 36a, 38a running outside the coil assemblies 36a, 38a, which is indicated purely schematically by magnetic field lines 40.

The system 35 of FIG. 9b corresponds to the system 35 of FIG. 9a, with a further first coil assembly 36b and a further second coil assembly 38b additionally being provided that can each be operated synchronously (e.g. connected in parallel or in series to the adjacent coil assembly 36a, 38a). The system 35 of FIG. 9a is thus doubled so-to-say, with the coil assemblies 36a, 36b and 38a, 38b each being able to be rotated by 180° so that the common magnetic field extends in the same sense through all the coil assemblies (see magnetic field lines 40 provided with arrows in FIG. 9b). An advantageous increase in the magnetic flux can thus be achieved that promotes the system efficiency. This can also be recognized from the changed shape of the alternating magnetic field (cf. schematic magnetic field lines 40) that extends largely in parallel with the "direction of transmission" (transversely to the auxiliary line A) in comparison with the system 35 of FIG. 9a.

It is understood that the first and second coil assemblies 36a, 36b and 38a, 38b in FIG. 9b do not necessarily each have to be rotated by 180° to achieve the same-sense magnetic field. The direction of current application of the primary coils P can alternatively also be changed. The assembly of the primary coils P and secondary coils S can therefore also be specularly symmetrical.

The portion of the alternating magnetic field that extends through the coil assemblies 36, 38 and is thus effectively usable can be further increased in that the system 35 is supplemented by further coil assemblies 36c, 38c. A further first coil assembly 36c and a further second coil assembly 38c, that can each be connected in parallel, are arranged at an angle of 90° relative to the coil assemblies 36a, 36b, 38a, 38b in FIG. 9c. An advantage of this variant is that the coil assemblies 36a to 36c and 38a to 38c at most slightly mutually influence one another with respect to their resonance behavior at an angle of 90°. It is shown in FIG. 9d that the recognizable effect of a "contracted magnetic field" can be further amplified in that the system 35 is supplemented by additional first and second coil assemblies 36d, 36e and 38d, 38e that are each arranged—purely by way of example—at an angle of 45° relative to the other first and second coil assemblies 36a to 36c and 38a to 38c.

REFERENCE NUMERAL LIST 10a-f, 20a-f,
30a-f, 40a-e,
50a-e resonance spectrum
12 coordinate system
14 x axis
16 y axis
18 measurement point
22 RF-coax-B field coil
24 coaxial cable
26 main conductor
28 shielding conductor
32 insulation material
34, 34' section
35 system
36a-e first coil assembly
38a-e second coil assembly
40 magnetic field line
A auxiliary line
P primary coil
S secondary coil

The invention claimed is:

1. A coil assembly for generating or for receiving alternating magnetic fields, said coil assembly comprising:
   at least one primary coil having at least one winding; and
   at least one secondary coil provided for a selective influencing of a resonance behavior of the coil assembly and having at least one winding, wherein the primary coil has a main conductor and a shielding conductor at least sectionally surrounding the main conductor; and
   wherein the shielding conductor is electrically conductively connected to the main conductor and has at least one section that is electrically interrupted.

2. The coil assembly in accordance with claim 1, wherein the at least one secondary coil has a main conductor and a shielding conductor at least sectionally surrounding the main conductor.

3. The coil assembly in accordance with claim 1, wherein the shielding conductor is not electrically conductively connected to the main conductor and/or does not have any electrical interruption.

4. The coil assembly in accordance with claim 1, wherein the terminals of the secondary coil are open.

5. The coil assembly in accordance with claim 1, wherein at least one of the primary coil and the secondary coil is at least sectionally configured as a coaxial cable or as coaxial cables.

6. The coil assembly in accordance with claim 1, wherein the at least one secondary coil is arranged coaxially to the primary coil.

7. The coil assembly in accordance with claim 1, wherein the at least one secondary coil is directly or indirectly fastened to the primary coil.

8. The coil assembly in accordance with claim 1, wherein the diameter of the secondary coil is at least substantially equal to the diameter of the primary coil.

9. The coil assembly in accordance with claim 1, wherein the secondary coil can be acted on by a data signal and/or is configured to receive a data signal.

10. A system having at least one first coil assembly for generating alternating magnetic fields and having at least one second coil assembly for receiving alternating magnetic fields, wherein at least one of the first and second coil assemblies comprises:
    at least one primary coil having at least one winding; and
    at least one secondary coil provided for a selective influencing of a resonance behavior of the coil assembly and having at least one winding, wherein the primary coil has a main conductor and a shielding conductor at least sectionally surrounding the main conductor; and
    wherein the shielding conductor is electrically conductively connected to the main conductor and has at least one section that is electrically interrupted.

11. The system in accordance with claim 10, wherein the resonance behavior of the first coil assembly and the resonance behavior of the second coil assembly are adapted to one another.

12. The system in accordance with claim 10, wherein the first and second coil assemblies are configured for transmitting a data signal such that the first and secondary coil assemblies can be acted on by said data signal and/or is configured to receive said data signal.

13. A method for using a coil assembly, the method comprising:
    utilizing at least one primary coil having at least one winding; and
    selectively influencing a resonance behavior of the coil assembly with at least one secondary coil the at least one secondary coil having at least one winding, wherein the primary coil has a main conductor and a shielding conductor at least sectionally surrounding the main conductor;
    electrically conductively connecting the shielding conductor to the main conductor; and
    electrically interrupting at least one section of the shielding conductor to wirelessly supply an electrical energy store with electrical energy.

14. The method in accordance with claim 13, further comprising:
    wirelessly supplying a mobile electric or electronic apparatus with electrical energy.

15. The method in accordance with claim 13 further comprising:
    transmitting a data signal, with the coil assembly, wherein the secondary coil is acted on by the data signal and/or is configured to receive a data signal for transmitting the data signal.

16. The method in accordance with claim 13 further comprising:
    providing a second coil assembly;
    coupling the primary coil of the first coil assembly to an electrical supply network; and
    coupling a primary coil of the second coil assembly to an electrical energy store.

17. The method in accordance with claim 13 further comprising:
    receiving a data signal with the secondary coil, wherein the secondary coil of the first coil assembly is coupled to a data source and the secondary coil of the second coil assembly is coupled to a data receiver, and vice versa.

* * * * *